Figure 1:
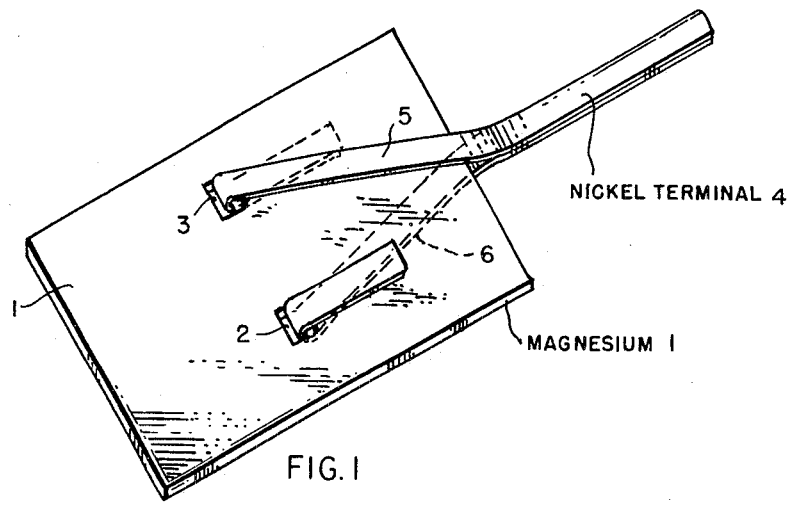

May 19, 1970     A. FISCHBACH ET AL     3,513,034

TERMINAL FOR THERMAL CELLS

Filed April 6, 1956

*INVENTOR.*
ADOLPH FISCHBACH
JOHN E. TETI
BY
*Harry M. Saragovitz*
ATTORNEY

3,513,034
TERMINAL FOR THERMAL CELLS

Adolph Fischbach, Elberon Park, and John E. Teti, West Long Branch, N.J., assignors to the United States of America as represented by the Secretary of the Army
Filed Apr. 6, 1956, Ser. No. 577,908
Int. Cl. H01n 13/10
U.S. Cl. 136—134      2 Claims The invention described herein may be manufactured and used by or for the Government for governmental purposes without the payment of any royalty thereon.

This invention relates to a terminal for thermal batteries, that is, batteries made up from fused electrolyte cells. Thermal batteries have been defined by R. B. Goodrich and Richard C. Evans (Jour. of Electrochem. Soc., vol. 9, August 1952) as electrochemical power supplies based upon electrolytes of various inorganic salts which remain solid and nonconductive at all storage temperatures. If these batteries are heated to some specified elevated temperature the electrolyte melts, becomes conductive and electrical energy may then be withdrawn from the system.

The negative electrodes of thermal cells consist usually of magnesium, calcium or certain alloys of lithium or other metals high in the electromotive series. The electrolytes of such cells are generally composed of alkali or alkaline earth chlorides, bromides and nitrates in various combinations. The depolarizer material usually consists of iron oxide, tungstic oxide, molybdenum trioxide, sodium or potassium zinc-chromate and similar insoluble oxidizing agents. The depolarizer electrode is usually made by applying these materials as a coating onto a metallic grid which may be made of silver, copper, nickel or iron.

Thermal batteries are used for special purpose applications, for instance, as power sources in guided missiles, because of their exceptional shelf stability, temperature range and ruggedness as well as their good weight and volume factors. For such special purpose applications a thermal battery may be built up of flat cells each cell being inclosed in a thin sheet metal casting made, for instance, of nickel. The required number of such fused-electrolyte cells is connected in series with insulating heating pads sandwiched in between the cells. At the desired moment the heating pads are fired by a priming, e.g., by an electric match and supply the heat necessary to raise the cell temperature above the melting point of the electrolyte which may be from as low as 150° C. to 600° C. and higher.

An insulating heating pad consists of a combination of electrical insulating material (glass fiber, asbestos, mica, etc.) and a heat powder (e.g., a mixture of about 20 percent of zirconium and 80 percent barium chromate). After the heat powder has been burned the insulating material remains in the form of a continuous dielectric layer between the cells, electrically insulating them from one another.

The terminal of the negative magnesium electrode usually consists of a nickel tab which is spot-welded to the magnesium plate so as to insure the highest possible mechanical and electrical contact.

Great difficulties have been encountered with these tabs during the use of such batteries, that is, after the heating pads have been fired. It appears that some corrosive action is taking place in the presence of the molten electrolyte at the high firing temperature which loosens the weld between the nickel tab and the magnesium electrode giving voltage fluctuations and high contact resistance.

It is an object of this invention to overcome these particular difficulties and to provide the negative electrode with a tab structure which is resistant to the corrosive action of the electrolyte during operation of the cell at high temperature.

This and other objects of the invention are achieved by providing a metal tab, one end of which is bifurcated. The two legs of the bifurcated end are placed over the negative electrode plate, one on each side with the end of each leg folded over the edge of the electrode. The legs may be folded over an outer edge of the electrode or over the edges of slots provided within the negative electrode plate.

Figure 2:
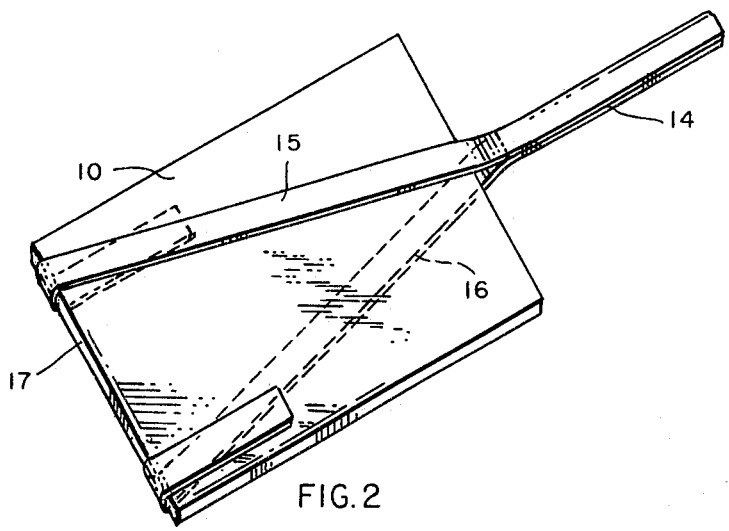

The invention will become more apparent from the embodiments shown in the accompanying drawing, in which FIG. 1 is an isometric view of a negative electrode with the legs of the bifurcated terminal tab folded over edges of slots provided within the electrode, and FIG. 2 is an isometric view of a similar magnesium electrode in which the legs of the bifurcated terminal are folded over the outer edge of the electrode.

The electrode of FIG. 1 consists of a magnesium foil 1 of about .015" thickness. Two slots 2 and 3 are cut into the magnesium foil 1. The bifurcated terminal tab 4 is conveniently made by folding over lengthwise on itself a thin nickel strip of about .05" width giving a double strip of about .25" width. The end of this double strip is split into legs 5 and 6. The leg 5 is placed over one side of the magnesium electrode 1 and the leg 6 over the other side, and both are then threaded thru the respective slots 2 and 3 with the ends flapped over the edges of said slots. The entire electrode is then pressed at 40,000 pounds per square inch. The two legs 5 and 6 are afterwards spot-welded to the magnesium foil 1.

The electrode according to FIG. 2 consists of a magnesium foil 10 of about the same thickness as the foil 1 of FIG. 1. The bifurcated terminal tab 14 may be fabricated in the same manner as described for the tab 4 of FIG. 1 except for the fact that the two legs 15 and 16 of the tab 14 are made long enough to be folded over the outer edge 17 of the magnesium foil 10. Thus the leg 15 is placed over the entire length of one side of the magnesium foil 10 and the leg 16 is placed over the entire length of the other side and both ends are then flapped over the outer edge 17. The whole structure is then treated as described for the electrode shown in FIG. 2.

Thermal batteries having magnesium electrodes made according to the present invention show no voltage fluctuation during discharge. Inspection of the discharged batteries shows that the spot-welded nickel tab has retained its mechanical contact in spite of the corrosive action taking place during the operation of the thermal battery. In distinction thereto about 20 to 30 percent of the cells of conventional thermal batteries will exhibit considerable voltage fluctuations during discharge and inspection after discharge will prove that the corrosive action of the high melting electrolyte has loosened the weld between the nickel tab and the magnesium foil.

It will be obvious to those skilled in the art that the bifurcated terminal may be made by methods other than the one described and that various metals or alloys may be used for making such tabs provided they are inert to the reactions that will occur within the cell at high temperatures.

What is claimed is:

1. A negative electrode for thermal cells comprising a thin, flat electrode plate and a terminal, said terminal consisting of a metal tab, one end of said metal tab being bifurcated, the two legs of said bifurcated end being placed over said metal plate one on each side with the end of each leg folded over a free edge of the metal plate.

2. A negative electrode for thermal cells according to claim 1 in which slots are provided in said thin, flat electrode plate whereby the ends of the two legs of said bifurcated metal tab are threaded thru said slots with the ends of said legs flapped over the edges of said slots.

References Cited

UNITED STATES PATENTS 2,861,115  11/1958  Berg _____ 136—134 X

LELAND A. SEBASTIAN, Primary Examiner

H. E. BEHREND, Assistant Examiner

U.S. Cl. X.R.

136—100